M. TWEDT.
APPARATUS FOR REMOVING SMUT FROM GRAIN.
APPLICATION FILED SEPT. 12, 1911.
1,048,767.
Patented Dec. 31, 1912.
2 SHEETS—SHEET 1.
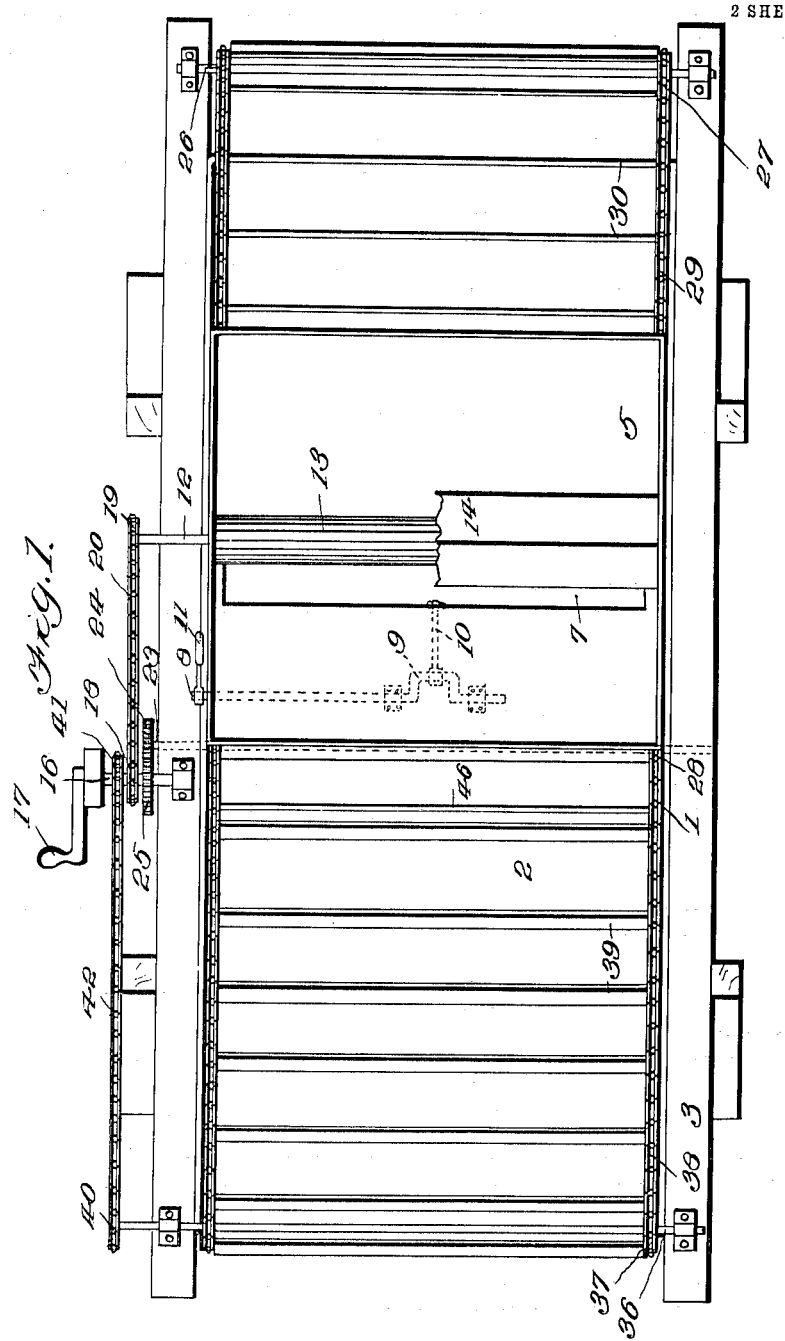
Witnesses
Inventor
M. Twedt.
By
Attorney.

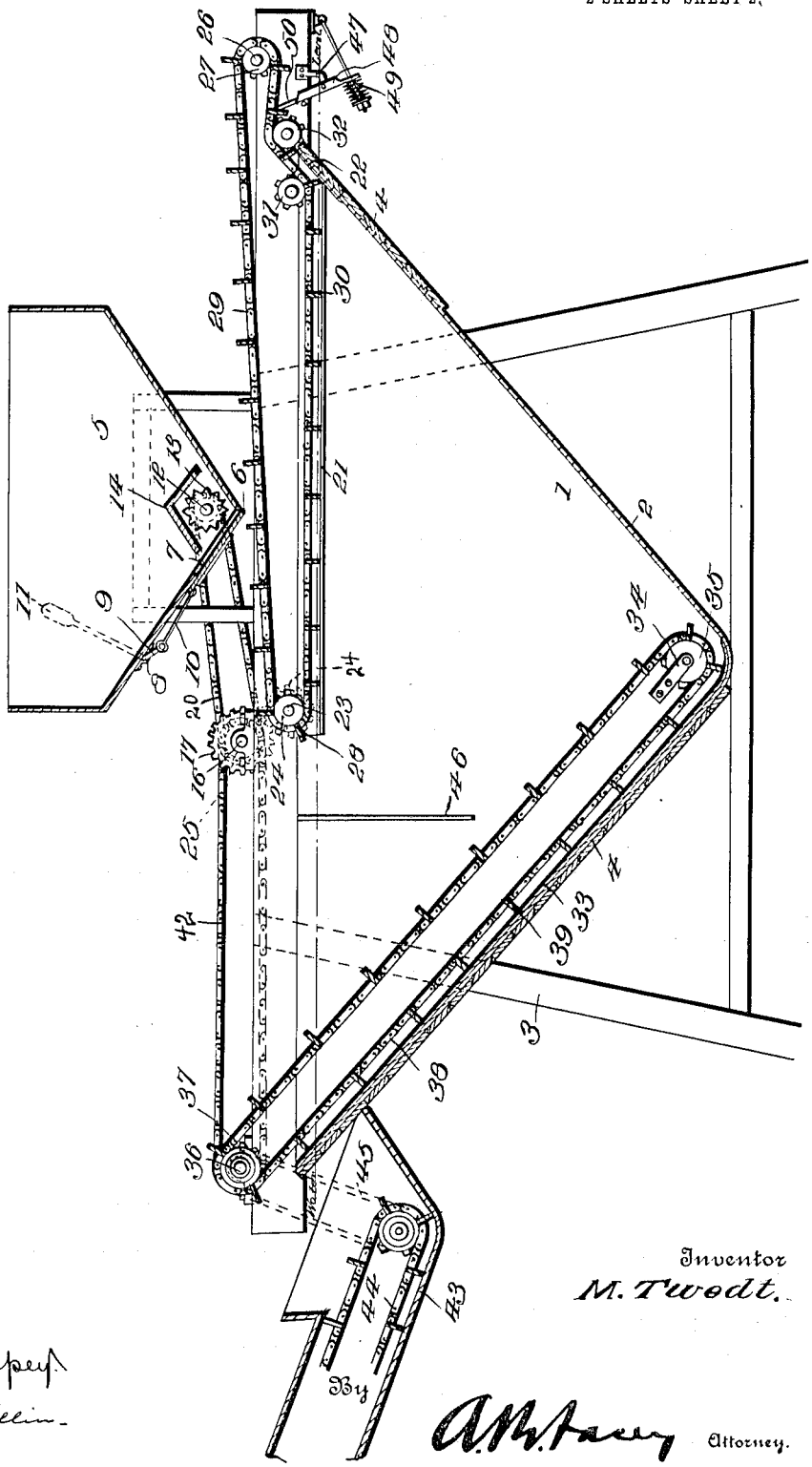

UNITED STATES PATENT OFFICE.

MARTIN TWEDT, OF SHELDON, NORTH DAKOTA.

APPARATUS FOR REMOVING SMUT FROM GRAIN.

1,048,767.

Specification of Letters Patent. Patented Dec. 31, 1912.

Application filed September 12, 1911. Serial No. 648,943.

*To all whom it may concern:*

Be it known that I, MARTIN TWEDT, citizen of the United States, residing at Sheldon, in the county of Ransom and State of North Dakota, have invented certain new and useful Improvements in Apparatus for Removing Smut from Grain, of which the following is a specification.

This invention relates to apparatus for removing smut from grain, and has for its object to provide means for subjecting the grain to a bath as it passes through a vat, whereby the smut is loosened from the grain and separated therefrom, means being provided for recovering the grain and also means being provided for removing the refuse material from the vat.

With this object in view the apparatus includes a vat mounted upon a stand, the said vat having a bottom with synclinal side portions.

A conveyer is arranged in the vat so that its lower run will move in an upward direction along one of the side portions of the bottom. A hopper is located above the vat and is provided with a feeding mechanism.

A conveyer is arranged at the upper portion of the vat and is adapted to serve as a skimmer for removing the refuse material from the liquid contained in the vat after it has been separated from the grain. A cleaning device is provided for the last mentioned conveyer.

For a full understanding of the invention reference is to be had to the following description and accompanying drawing, in which:

Figure 1 is a top plan view of the apparatus; and Fig. 2 is a vertical longitudinal sectional view of the same.

Corresponding and like parts are referred to in the following description and indicated in all the views of the accompanying drawing by the same reference characters.

The apparatus consists of a vat 1 having its bottom provided with synclinal side portions 2. The said vat is suitably mounted upon a stand 3. The vat 1 is preferably made from sheet metal and the side portions of its bottom are reinforced by cross boards or strips 4. These boards are designed to hold the side portions of the bottom in proper planes.

A hopper 5 is mounted upon the stand 3 over the top of the vat 1 and is provided in its bottom with a discharge outlet 6. A valve 7 is slidably mounted in the hopper 5 and is adapted to move over the opening 6 and increase or diminish the passageway therethrough. A shaft 8 is journaled upon the hopper 5 and is provided with a crank 9 which is connected by means of a link 10 with the valve 7. The shaft 8 is provided with a crank handle 11. Thus it will be seen that by turning the shaft 8 the link 10 will be moved longitudinally, whereby the valve 7 will be shifted and the passageway through the opening 6 may be increased or diminished.

A shaft 12 is journaled in the ends of the hopper 5 and within the hopper is provided with a feeder 13. An inverted V shaped partition 14 is located in the hopper above the feeder 13 and its edges are spaced from the bottom of the hopper so that grain deposited in the hopper may pass down under the said partition and be engaged by the feeder 13. The feeder 13 is located directly above the discharge outlet 6 in the bottom of the hopper.

A shaft 16 is journaled upon the frame 3 and is provided at one end with a crank handle 17. The said shaft is also provided with a sprocket wheel 18 and the said shaft 12 is provided with a sprocket wheel 19. A sprocket chain 20 is trained around the sprocket wheels 18 and 19 and is adapted to transmit rotary movement from the shaft 16 to the shaft 12 and the feeder mounted thereon.

Strips of angle iron 21 are fixed to the sides of the vat 1 and are located approximately at the level of the liquid which the said vat is to contain. At their outer ends the said strips 21 merge into portions 22 which lie against the upper end portion of one of the synclinal portions of the bottom of the vat. A shaft 23 is journaled upon the frame 3 and carries a gear wheel 24. A gear wheel 25 is fixed to the shaft 16 and meshes with the gear wheel 24. A shaft 26 is journaled at one end of the top of the vat 1 and carries sprocket wheels 27. Sprocket wheels 28 are fixed to the shaft 23 and sprocket chains 29 are trained around the sprocket wheels 27 and 28. The chains 29 at the opposite sides of the vat are connected together by cross slats 30 and the said slats are of such a length that when they are at the under runs of the chains they bear at their ends upon the angle irons 21 and are also adapted to pass over and in contact with the extended portions 22 of the said irons 21. Idle sprocket wheels 31 are journaled in the sides of the vat 1 and the lower runs of the chains 29 pass under the wheels 31. These wheels are located in the vicinity of the outer ends of the angle strips 21 and serve to hold the lower runs of the chains down so that the slats 30 are maintained in contact with the angle strips 21 as they pass along the same. Sprocket wheels 32 are also journaled at the ends of the top of the vat 1 and the lower runs of the chains 29 pass over the sprocket wheels 32 after which the said chains 29 pass under and around the wheels 27 hereinbefore described. Therefore it will be seen that when the shaft 16 is rotated the shaft 23 is also rotated, and consequently the chains 29 and the slats 30 are moved in orbits along the upper portion of the vat 1. The lower runs of the chains 29 move in a direction from the middle portion of the vat toward the end thereof.

That portion 2 of the bottom of the vat 1 which is opposite the portion 2 upon which is located the extension strips 22 is provided with strips 33 which are located at the opposite sides of the vat. Brackets 34 are attached to the inner surfaces of the sides of the vat near the lower portion of the bottom thereof, and sprocket wheels 35 are journaled to the said brackets 34. A shaft 36 is journaled for rotation at the top of the vat and at the opposite end thereof from the shaft 26 and is provided with sprocket wheels 37. Sprocket chains 38 are trained around the sprocket wheels 35 and 37 and are connected together by cross slats 39. The chains 38 and slats 39 are arranged to travel in orbits with the lower run of the chain moving in a direction from the intermediate portion of the vat to the end thereof so that the ends of the slats 39 will travel along the strips 33 upon the bottom of the vat 1. A sprocket wheel 40 is fixed to the shaft 36 and a sprocket wheel 41 is fixed to the shaft 16. A sprocket chain 42 is trained around the sprocket wheels 40 and 41 and serves as means for transmitting rotary movement from the shaft 16 to the shaft 36. That end of the vat 1 which is located below the shaft 36 is known as the delivery end of the vat and it is located above a trunk 43 along which a conveyer 44 is arranged to travel and is operatively connected with the shaft 36 in any suitable manner, as at 45. Thus as the shaft 36 rotates the conveyer 44 is caused to travel along the trunk 43.

In operation liquid is filled into the vat 1 until it assumes a level approximately at the angle strips 21. In this liquid a suitable amount of formaldehyde or other chemical may have previously been incorporated. The grain to be treated is placed in the hopper 5 and the valve 7 is adjusted so that the grain may feed in proper quantities into the vat 1 through the outlet 6. The grain thus fed falls between the slats 39 into the liquid contained in the vat 1 and by the slats 30 which are at the lower runs of the chains 29 the material that is separated by the liquid from the grain and which floats is carried toward the shaft 26, while the grain precipitates toward the lowest point of the bottom of the vat 1. At the lowest point of the bottom of the vat the grain which is thus treated is encountered by the upwardly moving slats 39 and is carried up and delivered into the trunk 43 and is encountered by the conveyer 44 and carried along the said trunk to any suitable point.

A partition 46 is located in the upper portion of the vat 1 at a point between the shaft 23 and the shaft 36. The lower edge of this partition is above the upper runs of the chains 38 and the slats 39 carried thereby and the said partition is adapted to prevent the material which is separated from the grain and which floats from mixing with the grain as it is being carried up along one of the inclined portions of the bottom of the vat 1 toward the delivery end thereof. Arms 47 are fixed to one end of the frame 3 and a frame 48 is pivoted between the said arms. Springs 49 engage the frame 48 and serve to hold the same in a normal position. Flexible strips 50 of rubber or suitable material are carried upon the frame 48 and project into the paths of movement of the slats 30. Therefore as the slats pass the said strips 50 they come in contact with the same and any material that may adhere to the slats is thus swept from the same.

Having thus described the invention, what is claimed as new is:

1. An apparatus for treating grain comprising a vat, oppositely disposed, parallel laterally spaced tracks extending horizontally across the vat at the level of the water line thereof, sprocket wheels disposed at the opposite ends of the tracks, a skimmer including an endless belt passing over said wheels and having its lower run extending horizontally and having its side edges mounted for movement upon said tracks, said belt having outwardly projecting slats.

2. An apparatus for treating grain comprising a vat, oppositely disposed, parallel laterally spaced tracks extending horizontally across the vat at the level of the water line therein, belt supporting wheels mounted at the ends of the track, belt supporting and driving wheels mounted above the track and beyond the adjacent extremity of the vat, a flexible conveyer forming a skimmer and passing over said wheels and having outwardly projecting slats, the ends of said slats on the lower run of the conveyer being supported upon said tracks, a hopper located above the vat and arranged to discharge material into the same through the horizontal runs of the skimmer, and feeding means disposed within said hopper.

3. An apparatus for treating grain comprising a vat, a skimmer having a run mounted for horizontal movement in the vat, said skimmer including an endless conveyer formed with outwardly projecting slats, supporting rollers holding the lower run of the conveyer parallel to the water line of the vat, a roller mounted upon the upper end of the vat adjacent to the outer end of said run and over which the conveyer passes, and a roller mounted beyond the end of the vat and slightly above the last named roller and over which the conveyer passes, and a cleaning device including a pivotal supporting member having a cleaning terminal portion engaging said conveyer between the second and last named supporting rollers, and means holding the member with its terminal portion in yielding contact with the conveyer.

In testimony whereof I affix my signature in presence of two witnesses.

MARTIN TWEDT. [L. S.]

Witnesses:
GEO. S. MATTESON,
LEWIS EDINGER.